(12) United States Patent  
Foltz

(10) Patent No.: US 6,546,972 B1  
(45) Date of Patent: Apr. 15, 2003

(54) FILLER NECK FOR A FUEL SYSTEM

(75) Inventor: Dean C. Foltz, Shelbyville, IN (US)

(73) Assignee: Stant Manufacturing Inc., Connersville, IN (US)

(*) Notice: Subject to any disclaimer, the term of this patent is extended or adjusted under 35 U.S.C. 154(b) by 0 days.

(21) Appl. No.: 09/989,149

(22) Filed: Nov. 21, 2001

(51) Int. Cl.$^7$ .............................. B65B 1/04; B65B 3/00; B67C 3/00

(52) U.S. Cl. ........................ 141/349; 141/301; 141/302; 141/305; 141/308; 141/312; 141/348

(58) Field of Search .......................... 141/59, 301, 302, 141/305, 308, 312, 348–350, 367; 220/86.2; 137/587, 588

(56) References Cited

U.S. PATENT DOCUMENTS

| 5,056,570 A | 10/1991 | Harris et al. |
| 5,271,438 A | 12/1993 | Griffin et al. |
| 5,730,194 A | 3/1998 | Foltz |
| 5,732,840 A | 3/1998 | Foltz |
| 6,056,029 A | 5/2000 | Devall et al. |
| 6,189,581 B1 | 2/2001 | Harris et al. |

Primary Examiner—Timothy L. Maust  
(74) Attorney, Agent, or Firm—Barnes & Thornburg

(57) ABSTRACT

A filler neck includes a housing adapted to be coupled to a fuel-delivery conduit coupled to a fuel tank inlet of a vehicle fuel tank. The housing includes a passageway that defines an axis of the filler neck and is adapted to receive a pump nozzle. The filler neck further includes a shuttle positioned for movement in the passageway along the axis between a closed position to close the passageway and an opened position to open the passageway in response to engagement with the pump nozzle

19 Claims, 5 Drawing Sheets

FILLER NECK FOR A FUEL SYSTEM

BACKGROUND AND SUMMARY

The present disclosure relates to a fuel system for a vehicle, more particularly, to a filler neck for introducing fuel from a pump nozzle into a vehicle fuel tank.

Filler necks for fuel systems are known. See, for example, U.S. Pat. Nos.: 5,056,570; 5,271,438; 5,730,194; 5,732,840; 6,056,029; and 6,189,581B1.

According to the present disclosure, a filler neck is adapted for use with a fuel-delivery conduit. The fuel-delivery conduit defines an axis disposed transversely to an axis of the filler neck and is adapted to be coupled to a fuel tank inlet of a vehicle fuel tank. The filler neck comprises a housing and a shuttle. The housing is adapted to be coupled to the fuel-delivery conduit and includes a passageway that defines the axis of the filler neck and is adapted to receive a pump nozzle. The shuttle is positioned for movement in the passageway along the axis of the filler neck between a closed position to close the passageway and an opened position to open the passageway in response to engagement with the pump nozzle. The shuttle includes a side wall and a guide surface. The side wall defines an outlet aperture adapted for communication with the fuel-delivery conduit when the shuttle is positioned in the opened position. The guide surface is positioned to direct liquid fuel dispensed by the pump nozzle through the outlet aperture into the fuel-delivery conduit when the shuttle is positioned in the opened position. This arrangement promotes economy of space in the vehicle.

Illustratively, the side wall of the shuttle includes a first half and a second half which are defined by a first plane on which the axis of the filler neck lies. The first half defines an outlet aperture through which liquid fuel dispensed by the pump nozzle flows into the fuel-delivery conduit in a direction transverse to the axis when the shuttle is positioned in the opened position. The second half is apertureless so that liquid fuel dispensed by the pump nozzle flows through the outlet aperture.

Illustratively, the filler neck, the fuel-delivery conduit, and the vehicle fuel tank are part of a fuel system which also includes a fuel vapor re-circulation conduit coupled to the vehicle fuel tank. The housing of the filler neck defines a nozzle-receiving chamber adapted to receive a pump nozzle, a mixing chamber, and an aperture positioned in communication with the nozzle-receiving chamber and the mixing chamber. The housing is adapted to position the mixing chamber in communication with the fuel-delivery conduit and the fuel vapor re-circulation conduit.

The shuttle is positioned for movement in the aperture between a closed position to close the aperture and an opened position to open the aperture in response to engagement with the pump nozzle. The outlet aperture of the shuttle is positioned in the nozzle-receiving chamber when the shuttle is positioned in the closed position. The outlet aperture is positioned in the mixing chamber when the shuttle is positioned in the opened position so that liquid fuel dispensed by the pump nozzle can flow through the outlet aperture into the mixing chamber to mix with fuel vapor from the fuel vapor re-circulation conduit to provide a mixture of liquid fuel and fuel vapor for delivery through the fuel-delivery conduit to the vehicle fuel tank.

Additional features will become apparent to those skilled in the art upon consideration of the following detailed description of illustrative embodiments exemplifying the best mode as presently perceived.

BRIEF DESCRIPTION OF THE DRAWINGS

The detailed description particularly refers to the accompanying figures in which.

DETAILED DESCRIPTION OF THE DRAWINGS

Figure 1:
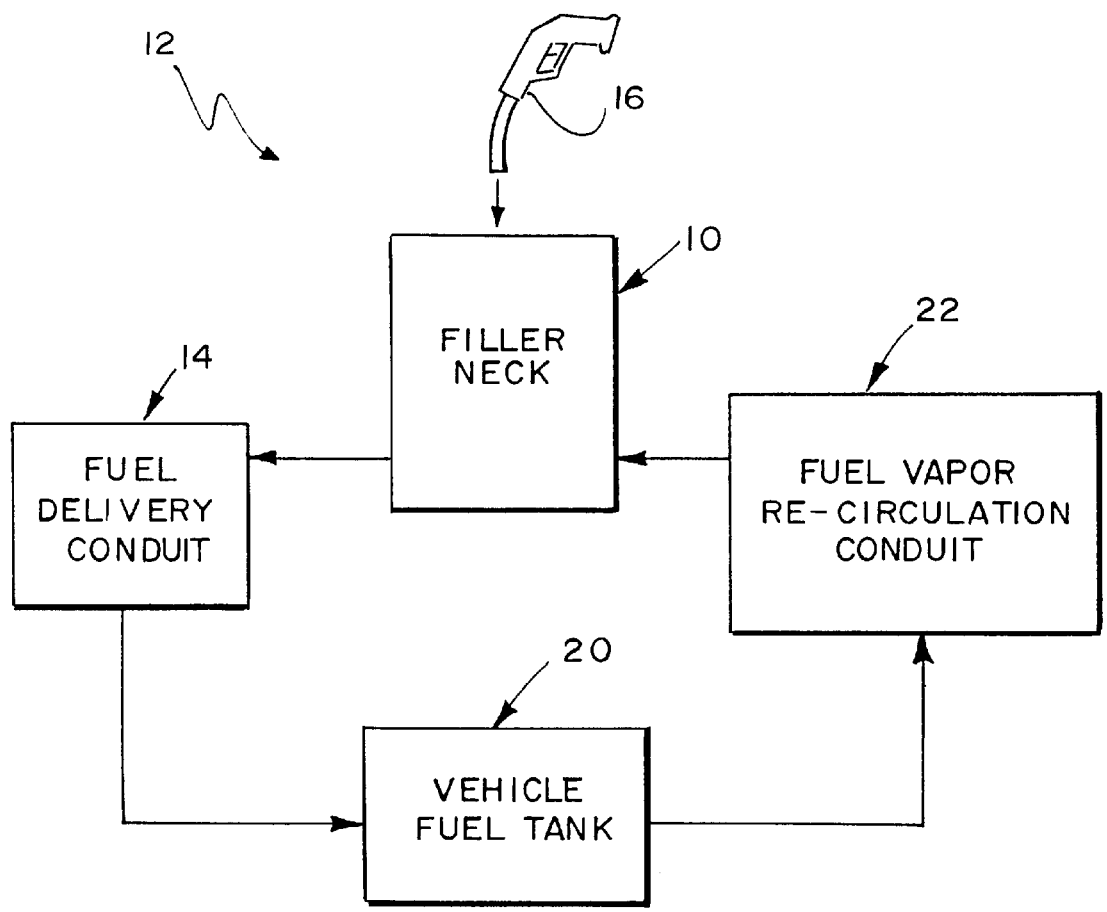
FIG. 1 is a block diagram showing a filler neck adapted to receive a pump nozzle and to be coupled to a fuel-delivery conduit and a fuel vapor recirculation conduit which are coupled to a vehicle fuel tank.

A filler neck 10 of a fuel system 12 is adapted to be coupled to a fuel-delivery conduit 14 for delivery of liquid fuel from a pump nozzle 16 to a vehicle fuel tank 20 of a vehicle, as illustrated, for example, in FIGS. 1–4. Filler neck 10 is also adapted to be coupled to a fuel vapor re-circulation conduit 22 coupled to fuel tank 20. Filler neck 10 is capless in that it is without a removable outer fuel cap typically used to close some types of filler necks.

Filler neck 10 includes a shuttle 26 positioned for movement along an axis 27 in a passageway 28 defined by a filler neck housing 30 between a closed position to close passageway 28 (FIG. 3) and an opened position to open passageway 28 (FIG. 4) in response to engagement with pump nozzle 16. A spring 31 of filler neck 10 biases shuttle 26 to its closed position. Shuttle 26 includes a side wall 32 and a guide surface 34 coupled to side wall 32.

Guide surface 34 is arranged to direct liquid fuel dispensed by pump nozzle 16 through an outlet aperture 36 defined by side wall 32 into an inlet portion 35 of fuel-delivery conduit 14. An axis 37 defined by inlet portion 35 is positioned non-parallel or transversely to axis 27. This arrangement promotes economy of space in the vehicle because it allows fuel system 12 to make a turn nearly immediately after liquid fuel is dispensed by pump nozzle 16 into fuel system 12.

Figure 2:
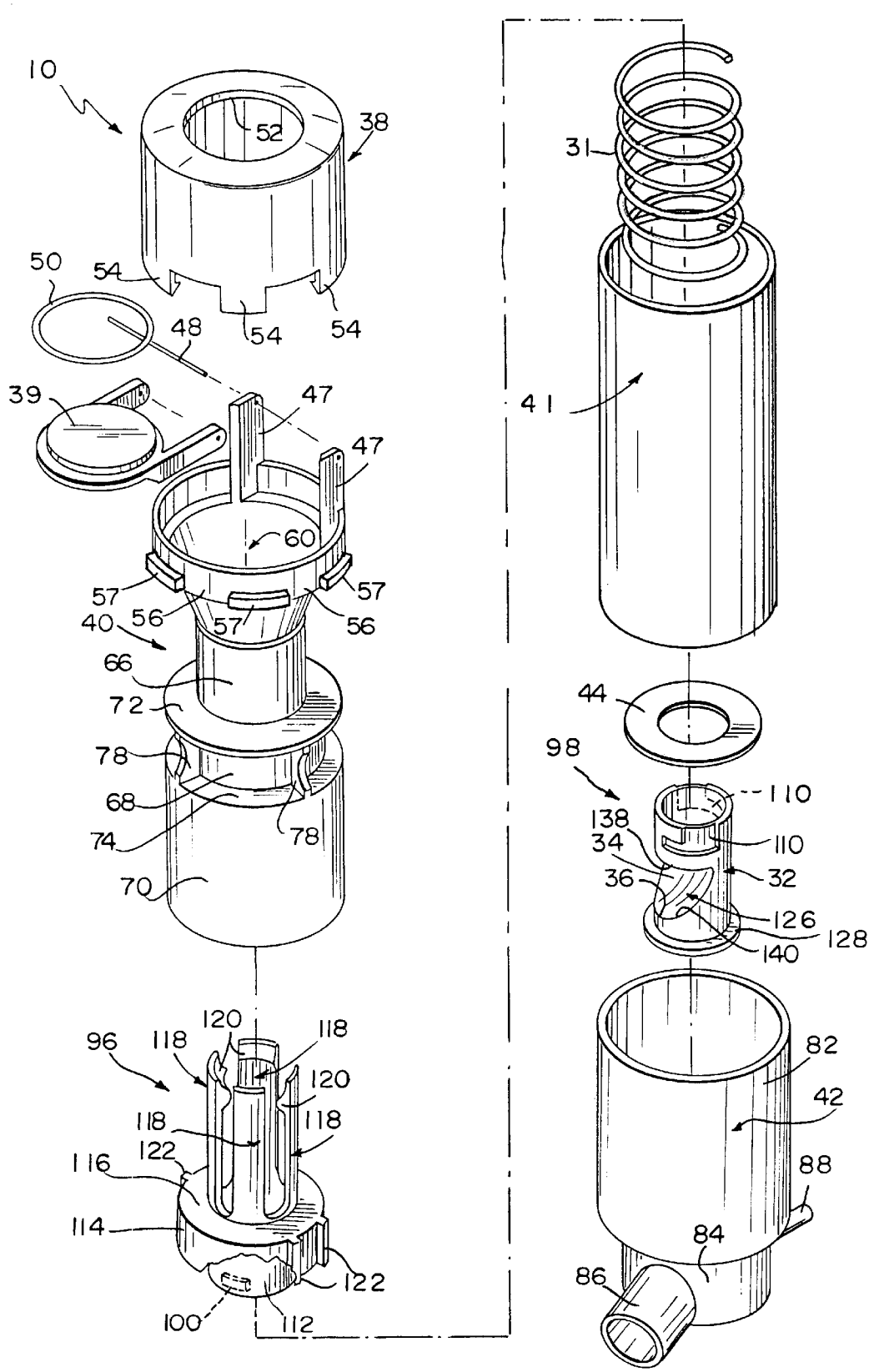
FIG. 2 is an exploded perspective view of the filler neck of FIG. 1.
Figure 3:
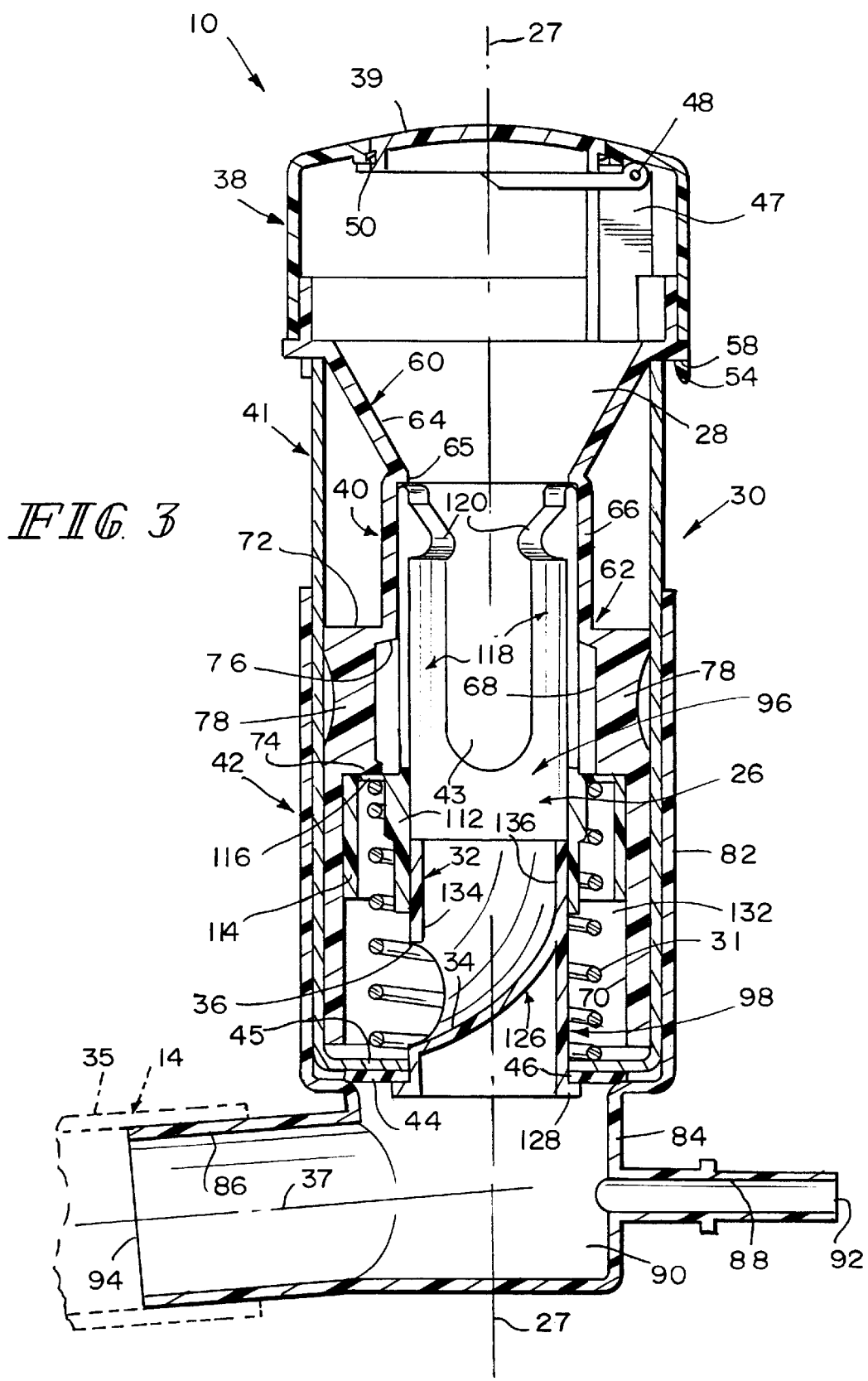
FIG. 3 is a longitudinal sectional view of the filler neck of FIG. 1 showing the filler neck including a housing and a shuttle positioned in a closed position to close a passageway of the housing.
Figure 4:
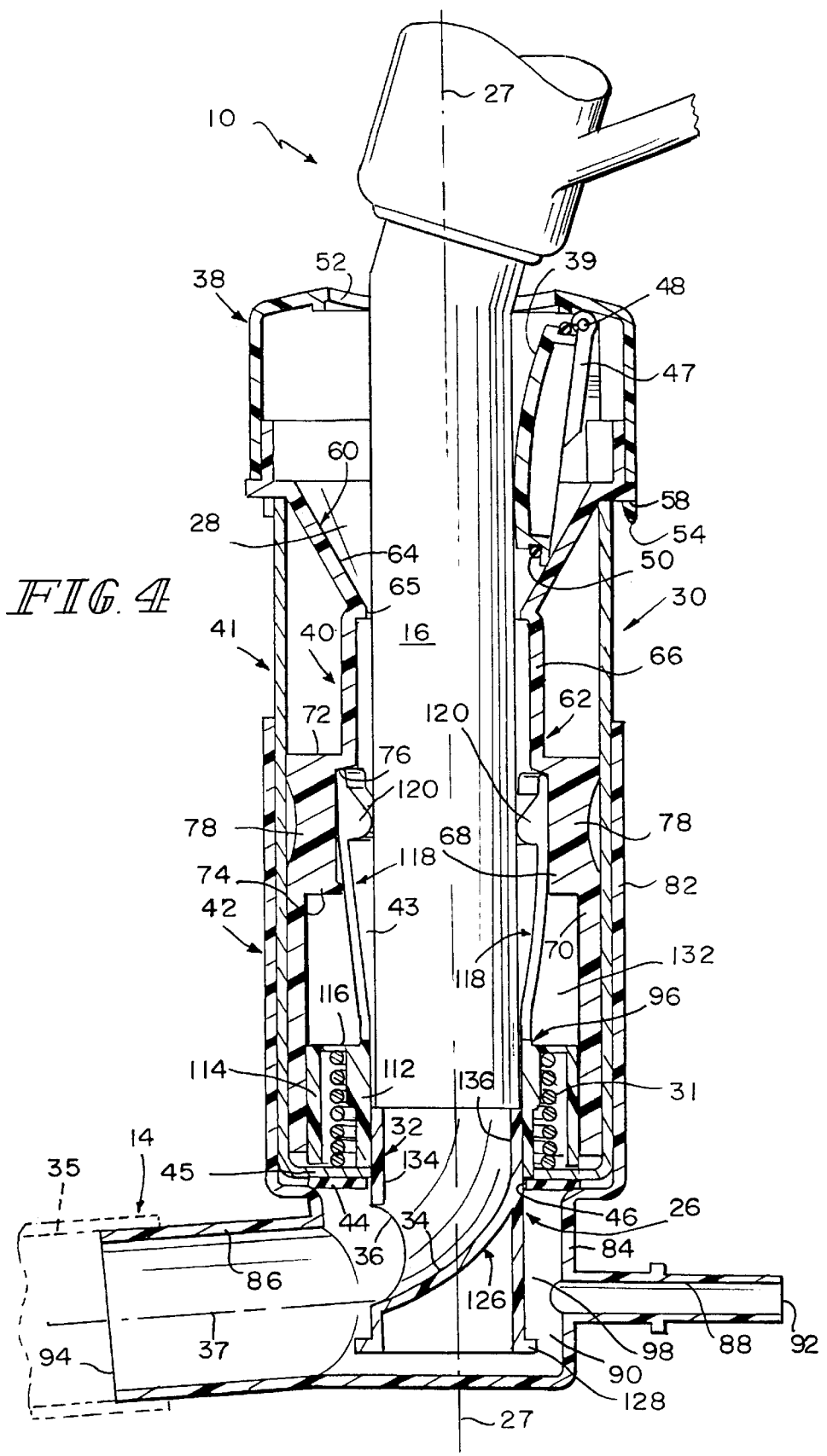
FIG. 4 is a longitudinal sectional view of the filler neck similar to FIG. 2 showing the shuttle positioned in an opened position to open the passageway of the housing.

Housing 30 includes a cover 38, a door 39, a guide 40, a sleeve 41, and a connector 42, as illustrated, for example, in FIGS. 2–4. Door 39 is mounted to guide 40. Cover 38, guide 40, and sleeve 41 cooperate to define a nozzle-receiving chamber 43. Guide 40 is positioned within sleeve 41 and is configured to guide pump nozzle 16 into engagement with shuttle 26. Guide 40 is also configured to guide shuttle 16 as it moves along axis 27. Connector 42 is coupled to sleeve 41 and is adapted to be coupled to fuel-delivery conduit 14 and fuel vapor re-circulation conduit 22. A valve seat 44 is positioned in contact with sleeve 41 and connector 42 for engagement with shuttle 26. Illustratively, valve seat 44 is a gasket. Valve seat 44 and a radially inwardly extending flange 45 of sleeve 41 cooperate to define a shuttle-receiving aperture 46 through which shuttle 26 moves along axis 27.

Door 39 is hinged to a pair of posts 47 by a pin 48 (FIG. 2). Door 39 includes a gasket 50 positioned to seal against an edge defining a first nozzle-receiving aperture 52 when door 39 is closed. A torsion spring (not shown) biases door 39 toward its closed position. Cover 38 includes a plurality of coupling flanges 54 arranged to slide through corresponding grooves 56 defined between bosses 57 to snap into engagement with a surface 58 to couple cover 38 to guide 40.

Guide 40 includes an axially outer, frusto-conically-shaped portion 60 and an axially inner portion 62 coupled to portion 60, as illustrated, for example, in FIGS. 2–4. Portion 60 includes a nozzle-guiding surface 64 leading to a second nozzle-receiving aperture 65.

Portion 62 is configured to guide shuttle 26 along axis 27. Portion 62 includes, in order of increasing diameter, an axially outer side wall 66, an axially intermediate side wall 68, and an axially inner side wall 70, as illustrated, for example, in FIGS. 2–4. An annular, first connector wall 72 is coupled to outer side wall 66 and intermediate side wall 68. First connector wall 72 includes a slightly inclined finger-engaging surface 76. An annular, second connector wall 74 is coupled to intermediate side wall 68 and inner side wall 70. A plurality of reinforcing ribs 78 are coupled to connector walls 72, 74 and intermediate side wall 68. Inner side wall 70 defines two diametrically opposite pairs of rail-receiving grooves (not shown), which are discussed in more detail below.

Connector 42 includes a sleeve portion 82, a mixing chamber portion 84, a fuel-delivery conduit connector 86, and a fuel vapor re-circulation conduit connector 88, as illustrated, for example, in FIGS. 2–4. Sleeve portion 82 is coupled to and surrounds sleeve 41. Mixing chamber portion 84 cooperates with valve seat 44 to define a mixing chamber 90. Connector 86 is adapted to be coupled to fuel-delivery conduit 14. Connector 88 is adapted to be coupled to fuel vapor re-circulation conduit 22. Connector 88 defines an inlet 92 through which fuel vapor can flow from fuel vapor re-circulation conduit 22 into mixing chamber 90 to mix with liquid fuel dispensed by pump nozzle 16. Connector 86 defines an outlet 94 through which a mixture of liquid fuel and fuel vapor can flow from mixing chamber 90 to fuel-delivery conduit 14.

Shuttle 26 includes an upper portion 96 and a lower portion 98 coupled to upper portion 96 via a bayonet-style connection, as illustrated, for example, in FIGS. 2–4. Illustratively, upper portion includes a pair of bosses 100 and lower portion 98 includes a pair of L-shaped grooves 110 (FIG. 2). Each groove 110 is sized to receive respective boss 100 to couple portions 96, 98 to one another.

Upper portion 96 includes a radially inner side wall 112, a radially outer side wall 114, and an annular connector wall 116 coupled to side walls 112, 114, as illustrated, for example, in FIGS. 2–4. One end of spring 31 abuts flange 45 while the other end of spring 31 abuts connector wall 116 within a spring-receiving cavity 118 defined by walls 112, 114, 116. Bosses 100 are coupled to an inner surface of inner side wall 112.

Upper portion 96 further includes a plurality of fingers 118, as illustrated, for example, in FIGS. 2–4. Each finger 118 is cantilevered to connector wall 116 at an axially inner end of finger 118. Finger 118 includes a nozzle-engaging boss 120 positioned at an axially outer end of finger 118. Illustratively, upper portion 96 has four such fingers 118.

Upper portion 96 also includes two diametrically opposite pairs of rails 122 coupled to an outer surface of outer side wall 114, as illustrated for example, in FIG. 2. Rails 122 are configured to slide within the rail-receiving grooves to prevent shuttle 26 from rotating about axis 27 as shuttle 26 moves along axis 27.

Lower portion 98 includes side wall 32, a guide wall 126, and a seat engaging flange 128, as illustrated, for example, in FIGS. 2–4. Side wall 32 defines outlet aperture 36. An outer surface of side wall 32 defines grooves 110 for bosses 100. Guide wall 126 is coupled to side wall 32 and includes guide surface 34 positioned in communication with outlet aperture 36. Side walls 112, 32 and guide surface 34 cooperate to define a shuttle passage 132 through which liquid fuel dispensed by pump nozzle 16 can flow. Guide wall 126 plugs an end of side wall 32 so that liquid fuel is directed out of shuttle passage 132 through outlet aperture 36. Seat-engaging flange 128 is coupled to and extends radially outwardly from side wall 32 to engage valve seat 44 when shuttle 26 is positioned in its closed position.

Figure 6:
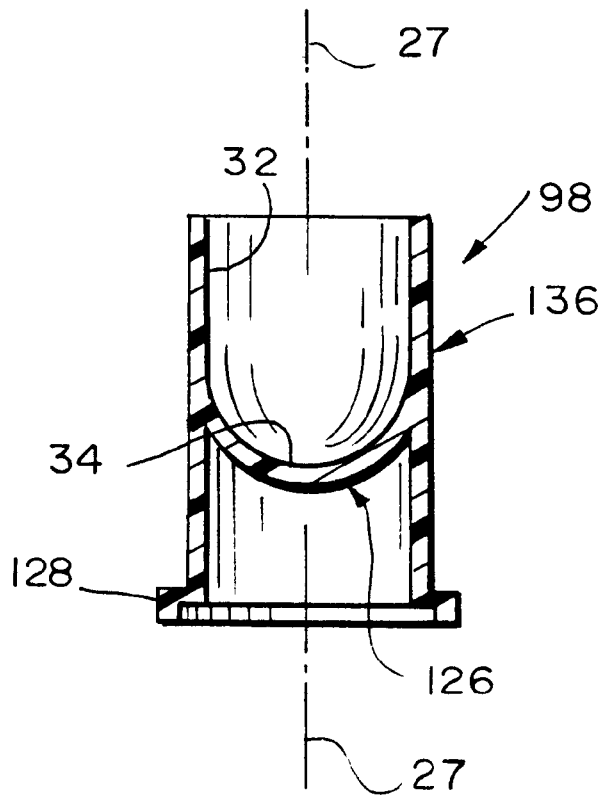
FIG. 6 is a longitudinal sectional view of the lower portion of the shuttle as viewed in a direction suggested by line 6—6 of FIG. 4.

Side wall 32 includes a first half 134 and a second half 136, as illustrated, for example, in FIGS. 3 and 4. A plane on which axis 27 lies and which is orthogonal to a plane defining the cross-section of FIGS. 3 and 4 defines first half 134 and second half 136. First half 134 defines outlet aperture 36. Second half, illustrated, for example, in FIG. 6, is apertureless so that all liquid fuel dispensed by pump nozzle 16 is directed through outlet aperture 36.

Outlet aperture 36 is defined by a first curved edge 138 and a second curved edge 140 coupled to first curved edge 138, as illustrated, for example, in FIGS. 2–4. Edge 138 lies on a plane that is orthogonal to axis 27. Edge 140 is generally U-shaped (which includes a parabolic shape). Each edge 138, 140 includes a first end and a second end. The first ends are coupled to one another. The second ends are coupled to one another.

Figure 5:
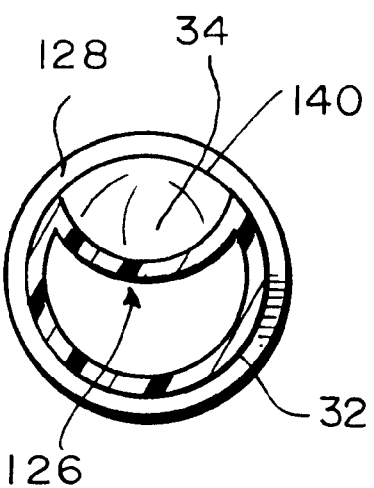
FIG. 5 is a transverse sectional view of a lower portion of the shuttle as viewed in a direction suggested by line 5—5 of FIG. 4.

Guide surface 34 is concave in three planes that are orthogonal to one another. These three planes define three cross-sections of guide surface 34. Axis 27 lies on the first and second planes and is orthogonal to the third plane. Illustratively, the first plane defines the cross-section illustrated in FIGS. 3 and 4 including a first concave guide surface cross-section. The second plane is the plane that defines first and second halves 134, 136 and defines the cross-section illustrated in FIG. 6 including a second concave guide surface cross-section. The third plane defines the cross-section of FIG. 5 including a third concave guide surface cross-section.

In its closed position, shuttle 26 is arranged to prevent liquid fuel from entering fuel tank 20 through housing passageway 28. Spring 31 biases seat-engaging flange 128 into engagement with valve seat 44 so that outlet aperture 36 is positioned in nozzle-receiving chamber 43. Fingers 118 are surrounded by outer and intermediate side walls 66, 68 of guide 40.

Shuttle 26 is moved from its closed position to its opened position against the bias of spring 31 in response to engagement with pump nozzle 16 with shuttle 26. Pump nozzle 16 is inserted through first nozzle-receiving aperture 52 past door 39. Nozzle-guiding surface 64 guides pump nozzle 16 through second nozzle-receiving aperture 65 into engagement with nozzle-engaging bosses 120 of fingers 118. As pump nozzle 16 is inserted further, bosses 120 slide against outer side wall 66 until the axially outer ends of fingers 118 reach finger-engaging surface 76. Further engagement of pump nozzle 16 with bosses 120 causes fingers 118 to flare radially outwardly along finger-engaging surface 76 into engagement with intermediate side wall 68. Pump nozzle 16 then slides past bosses 120 until pump nozzle 16 engages an axially outer end of side wall 32 of lower portion 98.

Shuttle 26 remains in its opened position so long as pump nozzle 16 remains in the space between bosses 120. Once pump nozzle 16 is withdrawn from that space, spring 31 causes the axially outer ends of fingers 118 to slide radially inwardly toward one another against finger-engaging surface 76 and urges shuttle 26 back to its closed position. Rails 122 slide in the rail-receiving grooves to prevent shuttle 26 from rotating about axis 27 as shuttle 26 moves between its closed and opened positions.

When shuttle 26 is positioned in its opened position, liquid fuel dispensed by pump nozzle 16 flows past guide surface 34 through outlet aperture 36 and outlet 94 into fuel-delivery conduit 14. Guide surface 34 is curved to turn the dispensed liquid fuel smoothly from a first direction generally parallel to axis 27 to a second direction transverse to the first direction. Guide surface 34 directs all the liquid fuel through outlet aperture 36. Outlet aperture 36 faces toward outlet 94 so that the dispensed liquid fuel flows directly through outlet 94 into inlet portion 35 of fuel-delivery conduit 14. Thus, fuel system 12 is configured to change the direction of flow of liquid fuel dispensed by pump nozzle 16 nearly immediately after liquid fuel is dispensed into fuel system 12 to promote economy of space in the vehicle.

Outlet aperture 36 faces away from inlet 92 so that, as liquid fuel flows through outlet aperture 36 and outlet 94, fuel vapor is drawn from fuel tank 20 through inlet 92 into mixing chamber 90 to mix with liquid fuel for delivery back to fuel tank 20. This arrangement causes liquid fuel to mix with fuel vapor, rather than air, to reduce the volatility of the fuel.

What is claimed is:

1. A filler neck for use with a fuel-delivery conduit defining an axis disposed transversely to an axis of the filler neck and adapted to be coupled to a vehicle fuel tank, the filler neck comprising a housing adapted to be coupled to the fuel-delivery conduit, the housing including a passageway that defines the axis of the filler neck and is adapted to receive a pump nozzle, and a shuttle positioned for movement in the passageway along the axis of the filler neck between a closed position to close the passageway and an opened position to open the passageway in response to engagement with the pump nozzle, the shuttle including a side wall and a guide surface, the side wall defining an outlet aperture adapted for communication with the fuel-delivery conduit when the shuttle is positioned in the opened position, the guide surface being positioned to direct liquid fuel dispensed by the pump nozzle through the outlet aperture into the fuel-delivery conduit when the shuttle is positioned in the opened position.

2. The filler neck of claim 1, wherein the guide surface includes an axially outermost portion and an axially innermost portion, and the axially outermost portion and the axially innermost portion are coupled to the side wall.

3. The filler neck of claim 2, wherein the axially outermost portion is coupled to an inner surface of the side wall, and the axially innermost portion is coupled to the side wall at the outlet aperture.

4. The filler neck of claim 1, wherein the guide surface is concave.

5. The filler neck of claim 1, wherein the guide surface is concave in two planes orthogonal to one another.

6. The filler neck of claim 1, wherein the guide surface is concave in three planes orthogonal to one another.

7. The filler neck of claim 1, wherein the side wall and the guide surface cooperate to define a shuttle passage that is positioned in communication with the outlet aperture and includes a single turn.

8. A filler neck for use with a fuel-delivery conduit adapted to be coupled to a vehicle fuel tank, the filler neck comprising a housing adapted to be coupled to the fuel-delivery conduit, the housing including a passageway that defines an axis and is adapted to receive a pump nozzle, and a shuttle positioned for movement in the passageway along the axis between a closed position to close the passageway and an opened position to open the passageway in response to engagement with the pump nozzle, the shuttle including a side wall, the side wall including a first half and a second half which are defined by a first plane on which the axis lies, the first half defining an outlet aperture through which liquid fuel dispensed by the pump nozzle flows into the fuel-delivery conduit in a direction transverse to the axis when the shuttle is positioned in the opened position, the second half being apertureless so that liquid fuel dispensed by the fuel pump flows through the outlet aperture.

9. The filler neck of claim 8, wherein the first half includes a first curved edge and a second curved edge coupled to the first curved edge to define the outlet aperture.

10. The filler neck of claim 9, wherein the second curved edge is generally U-shaped.

11. The filler neck of claim 9, wherein the first curved edge is positioned on a second plane perpendicular to the first plane and has opposite ends, and the second curved edge includes a first end and a second end which are coupled respectively to the opposite ends of the first curved edge.

12. The filler neck of claim 11, wherein the shuttle includes a guide surface coupled to the second curved edge to direct liquid fuel dispensed by the pump nozzle through the outlet aperture and in the direction transverse to the axis.

13. The filler neck of claim 8, wherein the first half and the second half cooperate to define a shuttle passage, and the shuttle is configured so that all liquid fuel dispensed into the shuttle passage by the pump nozzle discharges from the shuttle passage through the outlet aperture in the direction transverse to the axis.

14. A filler neck of a fuel system including a vehicle fuel tank, a fuel-delivery conduit coupled to a vehicle fuel tank, and a fuel vapor re-circulation conduit coupled to the vehicle fuel tank, the filler neck comprising a housing defining a nozzle-receiving chamber adapted to receive a pump nozzle, a mixing chamber, and an aperture positioned in communication with the nozzle-receiving chamber and the mixing chamber, the housing being adapted to position the mixing chamber in communication with the fuel-delivery conduit and the fuel vapor re-circulation conduit, and a shuttle positioned for movement in the aperture between a closed position to close the aperture and an opened position to open the aperture in response to engagement with the pump nozzle, the shuttle defining an outlet aperture positioned in the nozzle-receiving chamber when the shuttle is positioned in the closed position, the outlet aperture being positioned in the mixing chamber when the shuttle is positioned in the opened position so that liquid fuel dispensed by the pump nozzle can flow through the outlet aperture into the mixing chamber to mix with fuel vapor from the fuel vapor re-circulation conduit to provide a mixture of liquid fuel and fuel vapor for delivery through the fuel-delivery conduit to the vehicle fuel tank.

15. The filler neck of claim 14, wherein the housing further defines an outlet positioned in communication with the mixing chamber and connectable with the fuel-delivery conduit, and the outlet aperture faces toward the outlet when the shuttle is positioned in the opened position.

16. The filler neck of claim 15, wherein the housing further defines an inlet positioned in communication with the mixing chamber and connectable with the fuel vapor re-circulation conduit, and the outlet aperture faces away from the inlet when the shuttle is positioned in the opened position.

17. The filler neck of claim 16, wherein the housing includes a side wall that partially defines the mixing chamber and defines the outlet and the inlet so that the outlet and the inlet are disposed in generally opposite directions.

18. The filler neck of claim 16, wherein the housing includes a side wall that partially defines the mixing chamber and defines the outlet and the inlet, the shuttle includes a side wall that defines the outlet aperture, and the side wall of the housing surrounds the side wall of the shuttle.

19. The filler neck of claim 14, wherein the housing further defines an inlet positioned in communication with the mixing chamber and connectable with the fuel vapor re-circulation conduit, and the outlet aperture faces away from the inlet when the shuttle is positioned in the opened position.

* * * * *